Jan. 29, 1952   J. R. SIEBRANDT   2,583,896
BONE CLAMP
Filed Sept. 6, 1949
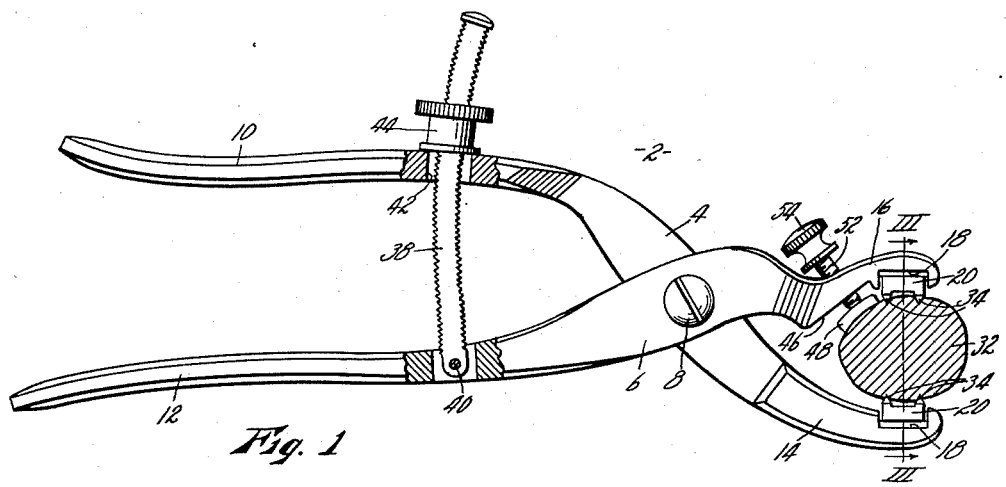
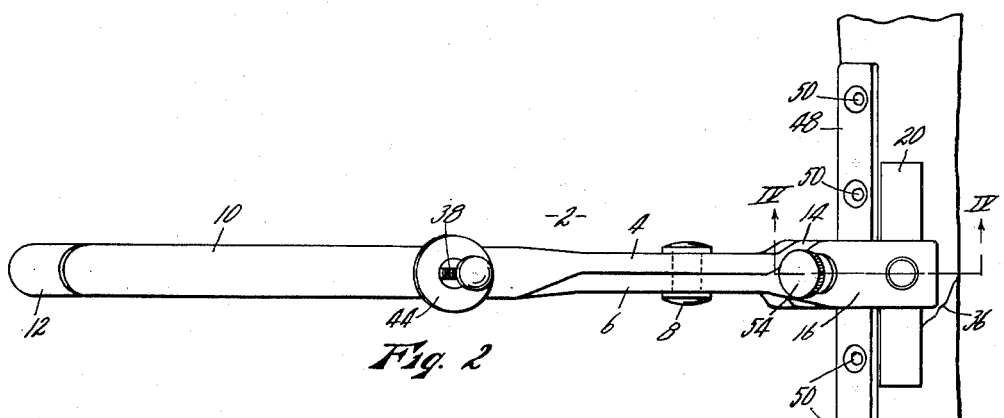
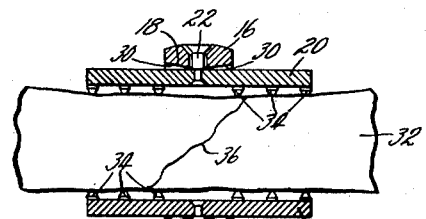
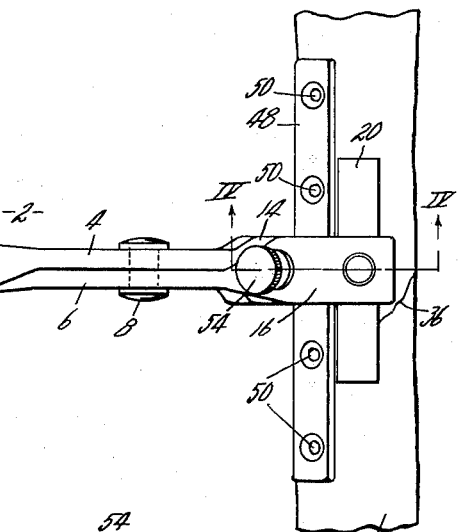
INVENTOR.
JOHN R. SIEBRANDT, Deceased
ELIZABETH SIEBRANDT, Exctrx
BY Roy E. Hamilton,
Attorney.

Patented Jan. 29, 1952

2,583,896

UNITED STATES PATENT OFFICE 2,583,896

BONE CLAMP

John R. Siebrandt, deceased, late of Kansas City, Mo., by Elizabeth Siebrandt, executrix, Kansas City, Mo., assignor to Siebrandt, Inc., Kansas City, Mo., a corporation of Missouri Application September 6, 1949, Serial No. 114,210

6 Claims. (Cl. 128—346)

This invention relates to new and useful improvements in bone clamps, and has particular reference to bone clamps for use in maintaining fragments of fractured bones in alignment.

In one method of setting broken bones, the bone fragments are brought into proper alignment and a plate is positioned against the bone bridging the fracture. Said plate is provided with holes, and corresponding holes are drilled in the bone to receive screws, whereby said bone is rigidly secured to said plate to maintain the bone fragments in proper alignment during the healing process. Holding the bone fragments in proper relation to each other and the plate in proper relation to the bone while the holes in the bone are drilled and the screws are set presents a considerable problem. The principal object of the present invention is, therefore, the provision of a bone clamp adapted to hold the fragments of a broken bone in proper alignment, and having means for positioning a plate firmly against said bone in bridging relation to the fracture.

Another object is the provision of a bone clamp having bone gripping members so adjustable as to accommodate themselves readily to the irregular contours of a bone clamped therebetween.

Other objects are simplicity and economy of construction, ease and convenience of operation, and adaptability to be used in conjunction with any type of plate.

With these objects in view, as well as other objects which will appear in the course of the specification, reference will be had to the drawing, wherein:

Figure 1 is a side elevation of a bone clamp embodying the present invention shown in operative relation to a broken bone, with parts broken away.

Fig. 2 is a plan view of the parts as shown in Fig. 1.

Fig. 3 is a section taken on line III—III of Fig. 1, with the bone left in elevation.

Fig. 4 is an enlarged fragmentary section of the upper jaw and related parts, taken on line IV—IV of Fig. 2.

Like reference numerals apply to similar parts throughout the several views, and the numeral 2 applies to a bone clamp embodying the present invention and including a pair of elongated body members 4 and 6 of substantially S-shape pivotally joined in crossed relation intermediate their ends by a pivot bolt 8. Said body members extend rearwardly from said pivot to form respectively the usual spaced apart hand grips 10 and 12, and extend forwardly from said pivot to form respectively spaced apart jaw members 14 and 16. Thus the clamp is of the usual pliers type, wherein jaws 12 and 14 are forced together when hand grips 10 and 12 are manually brought together.

Formed in the inner surface of each of said jaws, that is, the surface thereof adjacent the other of said jaws, and adjacent the outer end of said jaw, is a groove 18 extending transversely the entire width of said jaw. Carried in each of said grooves is a clamping member 20 having the form of an elongated rectangular bar disposed transversely to the associated jaw and extending outwardly from said jaw in both directions, as shown in Figs. 2 and 3. As best shown in Fig. 4, each of said clamp bars is loosely secured to its associated jaw member by a shouldered rivet 22 fixed rigidly in the clamp bar substantially at the center thereof. Said rivet extends outwardly through a loosely fitting hole 24 provided therefor in the jaw member, and is provided at its outer end with an enlarged head 26 carried loosely in an enlarged countersunk recess 28 formed therefor in the outer surface of said jaw member. It will be noted, as best shown in Fig. 3, that the base of groove 18 is inclined away from clamp bar in each direction from rivet 22, as at 30, said inclines extending from the longitudinal center line of the jaw member to the transverse edges of said jaw member. Due to these inclines, and due to the loose fit of rivet 22 in said jaw member, clamp bar 20 is permitted a limited degree of longitudinal tilting movement. Both clamp bars 20 are mounted in like manner, and are thus free to accommodate themselves to the irregular contours of a bone 32 clamped therebetween. Still further adjustability of said clamp bars is provided by making grooves 18 slightly wider than the clamp bars, whereby said clamp bars are permitted a limited swiveling movement. Each of clamp bars 20 is provided along each of the edges of its inner face with a plurality of inwardly projecting teeth or points 34, said teeth being adapted to bite into bone 32 to insure that the fragments of the bone will not move relative to the clamp bars.

Thus, assuming that bone 32 is fractured at 36, the fragments of the bone are brought into proper alignment as shown in Fig. 3 by means not shown, and bone clamp 2 is affixed thereto so that clamp bars 20 bridge the fracture, holding the bone fragments firmly in position, said clamp bars automatically pivoting as previously described to conform to the contours of the bone. Said clamp is secured in its clamping position by an elongated flat screw 38 pivotally secured at one end to hand grip 12 by means of pin 40, and extending through a slot 42 formed in hand grip 10. A knurled nut 44 is carried on the extended end portion of said screw, and may be brought against the outer surface of hand grip 10 to secure the clamp in its clamping position.

The inner surface of upper jaw member 16 is recessed as at 46 to provide a space between said jaw member and bone 32 immediately adjacent clamp bar 20. A splint plate 48 may be extended through said space to lie flat against the surface of bone 32 longitudinally thereof and bridge the bone fracture 36. Said plate may be of any suitable type, and usually comprises a plain metallic bar having holes 50 formed therethrough in longitudinally spaced relation for receiving screws. Said holes may be countersunk as shown. A set screw 52 having a knurled head 54 is threaded through jaw member 16, and is adapted to contact plate 48 at its inner end to hold said plate firmly in position against the bone. The set screw is disposed angularly to the plane of clamp bars 20 so as to be substantially radially disposed relative to bone 32. With the plate 48 thus held firmly in position, holes for receiving screws may be drilled in the bone corresponding to holes 50 of the plate, using the holes in the plate as guides. After the screws, not shown, have been inserted and drawn up to fix the plate rigidly to the bone, the clamp 2 may be removed and the flesh wound repaired.

Thus a bone clamp has been produced which is extremely simple and which will perform very efficiently its intended function of holding the bone fragments and the splint plate firmly in proper relation while holes are drilled in the bone and the plate is fixed to the bone. It will accommodate itself to the contour of the bone, and is adjustable to grip bones in a substantial range of sizes. It is contemplated that clamps of different sizes may be built for the treatment of bones still larger or smaller than can be treated by a single clamp. While a specific embodiment of my invention has been disclosed, it is apparent that many minor changes of construction and operation could be made without departing from the spirit of the invention.

What is claimed is:

1. A bone clamp comprising a pair of elongated body members pivotally connected intermediate their ends, the adjacent end portions of said body members respectively forming hand grips and jaw members, an elongated clamp bar secured transversely to each of said jaw members, said clamp bars being adapted to grip a bone therebetween and to bridge a fracture in said bone, and a set screw carried by one of said jaw members and adjustable to hold a plate firmly against said bone.

2. A bone clamp comprising a pair of elongated body members pivotally connetced intermediate their ends, the adjacent end portions of said body members respectviely forming hand grips and jaw members, an elongated clamp bar secured transversely to each of said jaw members, said clamp bars being adapted to grip a bone therebetween and to bridge a fracture in said bone, one of said jaw members being recessed adjacent the associated clamp bar to provide a space between said jaw member and said bone whereby a plate may be laid against said bone to bridge the fracture thereof, and a set screw carried by said recessed jaw member and adjustable to hold said plate firmly against said bone.

3. A bone clamp comprising a pair of elongated body members pivotally connected intermediate their ends, the adjacent end portions of said body members respectively forming hand grips and jaw members, an elongated clamp bar secured transversely to each of said jaw members, said clamp bars being adapted to grip a bone therebetween and to bridge a fracture in said bone, and a set screw carried by one of said jaw members and adjustable to hold a plate firmly against said bone, said set screw being disposed angularly to the plane of said clamp bars and substantially radially relative to said bone.

4. A bone clamp comprising a pair of elongated body members pivotally connected intermediate their ends, the adjacent end portions of said body members respectively forming hand grips and jaw members, an elongated clamp bar secured loosely to each of said jaw members for substantially universal pivoting movement relative thereto, said clamp bars being adapted to grip a bone therebetween and to bridge a fracture in said bone, means for securing said clamp in the bone gripping position, and means carried by one of said jaw members and operable independently of the movement of said jaws for holding a plate firmly against said bone.

5. A bone clamp comprising a pair of elongated body members pivotally connected intermediate their ends, the adjacent end portions of said body members respectively forming hand grips and jaw members, an elongated clamp bar secured transversely to each of said jaw members, for limited swiveling and longitudinal pivoting movement relative to said jaw members, said clamp bars having teeth formed on their adjacent surfaces whereby a bone may be tightly gripped therebetween with said clamp bars bridging a fracture in said bone, means for securing said clamp in the bone gripping position, and a set screw carried by one of said jaw members and adjustable to hold a plate firmly against said bone.

6. A bone clamp comprising a pair of elongated body members pivotally joined intermediate their ends, the adjacent end portions of said body members respectively forming hand grips and jaw members, an elongated clamp bar secured transversely to each of said jaw members for limited swiveling and longitudinal pivoting movement relative thereto, the adjacent surfaces of said clamp bars being provided with projecting teeth whereby a bone may be tightly gripped with said clamp bars bridging a fracture in said bone, releasable means for securing said clamp in the bone gripping position, one of said jaw members having a recess formed therein adjacent the associated clamp bar to provide a space between said jaw member and said bone whereby a plate may be laid against said bone to bridge the fracture thereof, and a set screw carried by said recessed jaw member and adjustable to hold said plate against said bone, said set screw being disposed angularly to the plane of said clamp bars and substantially radially relative to said bone.

ELIZABETH SIEBRANDT.
*Executrix of the Estate of John R. Siebrandt, Deceased.*

REFERENCES CITED

The following references are of record in the file of this patent:

UNITED STATES PATENTS

| Number | Name | Date |
|---|---|---|
| 2,460,470 | Rogers | Feb. 1, 1949 |

OTHER REFERENCES

General Catalog, V. Mueller & Co. (1938), page 248, item BS 1785. (Copy in Div. 55.)